United States Patent
Beek

(10) Patent No.: US 12,488,117 B1
(45) Date of Patent: Dec. 2, 2025

(54) SYSTEMS AND METHODS FOR DETERMINING CURRENT RISK OF CYBERSECURITY VULNERABILITIES

(71) Applicant: Rapid7, Inc., Boston, MA (US)

(72) Inventor: Christiaan Beek, Kesteren (NL)

(73) Assignee: Rapid7, Inc., Boston, MA (US)

( * ) Notice: Subject to any disclaimer, the term of this patent is extended or adjusted under 35 U.S.C. 154(b) by 36 days.

(21) Appl. No.: 18/679,631

(22) Filed: May 31, 2024

(51) Int. Cl.
*G06F 21/57* (2013.01)

(52) U.S. Cl.
CPC .................................. *G06F 21/577* (2013.01)

(58) Field of Classification Search
CPC ................................ G06F 21/57; G06F 21/577
See application file for complete search history.

(56) References Cited

U.S. PATENT DOCUMENTS

| | | | |
|---|---|---|---|
| 11,720,686 B1 * | 8/2023 | Cross ...................... | G06F 9/455 726/25 |
| 12,052,278 B1 * | 7/2024 | Ithal ...................... | H04L 63/205 |
| 12,423,444 B2 * | 9/2025 | Dongle ................... | G06N 20/00 |
| 2013/0191919 A1 * | 7/2013 | Basavapatna ........... | H04L 63/20 726/25 |
| 2016/0173521 A1 * | 6/2016 | Yampolskiy ..... | G06Q 10/06393 726/25 |
| 2017/0098087 A1 * | 4/2017 | Li ........................ | H04L 63/1416 |
| 2020/0097662 A1 * | 3/2020 | Hufsmith .............. | H04L 9/0643 |
| 2021/0279337 A1 * | 9/2021 | Mosby .................... | G06N 20/00 |
| 2023/0169179 A1 * | 6/2023 | Govindasamy .......... | G06F 9/54 726/25 |
| 2023/0185921 A1 * | 6/2023 | Karas ..................... | G06F 21/577 726/25 |
| 2024/0020391 A1 * | 1/2024 | Jha ......................... | G06F 21/577 |
| 2024/0134990 A1 * | 4/2024 | Loureiro ............. | H04L 63/1433 |

(Continued)

FOREIGN PATENT DOCUMENTS

| | | | | |
|---|---|---|---|---|
| CA | 3135483 A1 * | 10/2020 | ......... | H04L 63/1425 |
| CN | 110489970 A * | 11/2019 | ........... | G06F 21/577 |
| EP | 4525360 A1 * | 3/2025 | ............. | H04N 7/181 |

OTHER PUBLICATIONS

Jacobs et al., Enhancing Vulnerability Prioritization: Data-Driven Exploit Predictions with Community-Driven Insights. arXiv:2302.14172v2. Jun. 15, 2023:13 pages. doi: 10.48550/arXiv.2302.14172.

*Primary Examiner* — Oscar A Louie
(74) *Attorney, Agent, or Firm* — Wolf, Greenfield & Sacks, P.C.

(57) ABSTRACT

Techniques for analyzing cybersecurity vulnerabilities in a computing environment, including: using at least one computer hardware processor to perform: (A) identifying a first cybersecurity vulnerability associated with a resource in the computing environment; (B) obtaining data related to one or more factors related to risk posed by the first cybersecurity vulnerability, the one or more factors including at least one factor indicative of a degree of current exploitation of the first cybersecurity vulnerability; (C) determining, using the obtained data, one or more factor weights for the one or more factors related to the risk posed by the first cybersecurity vulnerability; (D) determining a first score for the first cybersecurity vulnerability using the determined one or more factor weights; and (E) performing one or more security actions based on the determined first score for the first cybersecurity vulnerability.

18 Claims, 4 Drawing Sheets

FIG. 2

(56) References Cited

U.S. PATENT DOCUMENTS

| | | | | |
|---|---|---|---|---|
| 2024/0171603 A1* | 5/2024 | Roytman | ............ | H04L 63/1466 |
| 2024/0411890 A1* | 12/2024 | Howe | ................... | G06F 21/577 |
| 2025/0053660 A1* | 2/2025 | Dwivedi | ............... | G06F 21/577 |
| 2025/0148084 A1* | 5/2025 | Foulon | .................. | G06F 21/577 |

* cited by examiner

SYSTEMS AND METHODS FOR DETERMINING CURRENT RISK OF CYBERSECURITY VULNERABILITIES

BACKGROUND

Modern computing environments are exposed to many cybersecurity vulnerabilities. These vulnerabilities can be analyzed to determine the risk posed to computing environments and any corrective actions to be taken. Cybersecurity vulnerabilities vary in their potential impact on computing systems, may be exploited in cyber-attacks to varying degrees, and are constantly evolving and being exploited in new cyber-attacks. Providing analysis of cybersecurity vulnerabilities allows for the efficient and effective mitigation of the risks posed by cybersecurity vulnerabilities.

Cybersecurity vulnerability analysis is important in a variety of computing environments including, but not limited to, cloud computing environments; private computing environments (e.g., computer infrastructure operated for one organization), public computing environments (e.g., computer infrastructure made available for use by others, for example, over the Internet or any other network, e.g., via subscription, to multiple organizations), a hybrid computing environment (a combination of publicly-accessible and private infrastructure) and/or using any other type of computing environment. Non-limiting examples of cloud computing environments include GOOGLE Cloud Platform (GCP), ORACLE Cloud Infrastructure (OCI), AMAZON Web Services (AWS), IBM Cloud, and MICROSOFT Azure.

SUMMARY

Some embodiments provide for a method for analyzing cybersecurity vulnerabilities in a computing environment, the method including: using at least one computer hardware processor to perform: (A) identifying a first cybersecurity vulnerability associated with a resource in the computing environment; (B) obtaining data related to one or more factors related to risk posed by the first cybersecurity vulnerability, the one or more factors including at least one factor indicative of a degree of current exploitation of the first cybersecurity vulnerability; (C) determining, using the obtained data, one or more factor weights for the one or more factors related to the risk posed by the first cybersecurity vulnerability; (D) determining a first score for the first cybersecurity vulnerability using the determined one or more factor weights; and (E) performing one or more security actions based on the determined first score for the first cybersecurity vulnerability.

In some embodiments, the method further includes: identifying a plurality of cybersecurity vulnerabilities associated with one or more assets in the computing environment, the plurality of cybersecurity vulnerabilities including the first cybersecurity vulnerability; performing acts (B), (C), and (D) for each of the plurality of cybersecurity vulnerabilities to obtain a respective plurality of scores, the plurality of scores including the first score; identifying, based on the plurality of scores, one or multiple cybersecurity vulnerabilities of the plurality of cybersecurity vulnerabilities with respect to which to perform a security action; and performing one or more security actions for the identified one or multiple cybersecurity vulnerabilities.

In some embodiments, identifying the one or multiple cybersecurity vulnerabilities with respect to which to perform a security action includes: identifying cybersecurity vulnerabilities, from among the plurality of cybersecurity vulnerabilities, as those cybersecurity vulnerabilities that have scores greater than a threshold score.

In some embodiments, the one or more factors related to risk posed by the first cybersecurity vulnerability further include one or more of: a factor indicative of presence of the first cybersecurity vulnerability in a cybersecurity provider database, a factor indicative of presence of the first cybersecurity vulnerability in Cybersecurity and Infrastructure Security Agency (CISA) Known Exploited Vulnerabilities (KEV) Catalog, a factor indicative of ease of exploitation of the first cybersecurity vulnerability, a factor indicative of whether a default configuration of the resource is exposed to the first cybersecurity vulnerability, a factor indicative of whether authentication by the computing environment is required for exploitation of the first cybersecurity vulnerability, a factor indicative of availability of a public exploit of the first cybersecurity vulnerability, and a factor indicative of the availability of the first cybersecurity vulnerability in a cybersecurity vulnerability testing platform.

In some embodiments, the at least one factor indicative of a degree of current exploitation of the first cybersecurity vulnerability includes one or more of: a factor indicative of whether the first cybersecurity vulnerability has been exploited, a factor indicative of whether the first cybersecurity vulnerability has been observed in ransomware attacks, and a factor indicative of whether the first cybersecurity vulnerability has been observed in a nation-state sponsored attack.

In some embodiments, obtaining data related to one or more factors related to risk posed by the first cybersecurity vulnerability includes requesting data related to the one or more factors from one or more data sources external to the computing environment.

In some embodiments, the one or more data sources external to the computing environment include one or more data sources selected from among: one or more cybersecurity databases, one or more cybersecurity platform feeds, one or more threat intelligence feeds, one or more cyber-attack reporting sources, and one or more social media platforms.

In some embodiments, obtaining data related to one or more factors related to risk posed by the first cybersecurity vulnerability includes receiving data related to the one or more factors from one or more data sources external to the computing environment.

In some embodiments, acts (C), (D), and (E) are performed in response to receiving the data related to the one or more factors from the one or more data sources external to the computing environment.

In some embodiments, the method further includes, after performing act (E): obtaining second data related to the one or more factors related to risk posed by the first cybersecurity vulnerability; determining, using the second data, one or more updated factor weights for the one or more factors related to the risk posed by the first cybersecurity vulnerability; determining an updated score for the first cybersecurity vulnerability using the determined one or more updated factor weights; and performing one or more security actions based on the determined updated score for the first cybersecurity vulnerability.

In some embodiments, the method further includes: comparing the second data to the data obtained in act (C); and determining, based on the comparing, whether the second data is different from the data obtained in act (C), wherein determining the one or more updated factor weights is performed in response to determining the second data is different from the data obtained in act (C).

In some embodiments, determining the first score for the first cybersecurity vulnerability includes: determining a base score for the first cybersecurity vulnerability based on a degree of impact and access requirements of the first cybersecurity vulnerability; and adjusting the base score for the first cybersecurity vulnerability using the factor weights for the one or more factors related to the risk posed by the first cybersecurity vulnerability.

In some embodiments, performing the one or more security actions based on the determined first score for the first cybersecurity vulnerability includes: recommending one or more corrective actions to a user, and/or automatically taking a corrective action to address the first cybersecurity vulnerability.

Some embodiments provide for a system for monitoring assets in a cloud computing environment, the system including: at least one computer hardware processor; and at least one non-transitory computer-readable storage medium storing processor-executable instructions that, when executed by the at least one computer hardware processor, causes the at least one computer hardware processor to perform a method. The method including: (A) identifying a first cybersecurity vulnerability associated with a resource in the computing environment; (B) obtaining data related to one or more factors related to risk posed by the first cybersecurity vulnerability, the one or more factors including at least one factor indicative of a degree of current exploitation of the first cybersecurity vulnerability; (C) determining, using the obtained data, one or more factor weights for the one or more factors related to the risk posed by the first cybersecurity vulnerability; (D) determining a first score for the first cybersecurity vulnerability using the determined one or more factor weights; and (E) performing one or more security actions based on the determined first score for the first cybersecurity vulnerability.

Some embodiments provide for at least one non-transitory computer-readable storage medium storing processor-executable instructions that, when executed by at least one computer hardware processor, causes the at least one computer hardware processor to perform a method for analyzing cybersecurity vulnerabilities in a computing environment. The method including: using at least one computer hardware processor to perform: (A) identifying a first cybersecurity vulnerability associated with a resource in the computing environment; (B) obtaining data related to one or more factors related to risk posed by the first cybersecurity vulnerability, the one or more factors including at least one factor indicative of a degree of current exploitation of the first cybersecurity vulnerability; (C) determining, using the obtained data, one or more factor weights for the one or more factors related to the risk posed by the first cybersecurity vulnerability; (D) determining a first score for the first cybersecurity vulnerability using the determined one or more factor weights; and (E) performing one or more security actions based on the determined first score for the first cybersecurity vulnerability.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
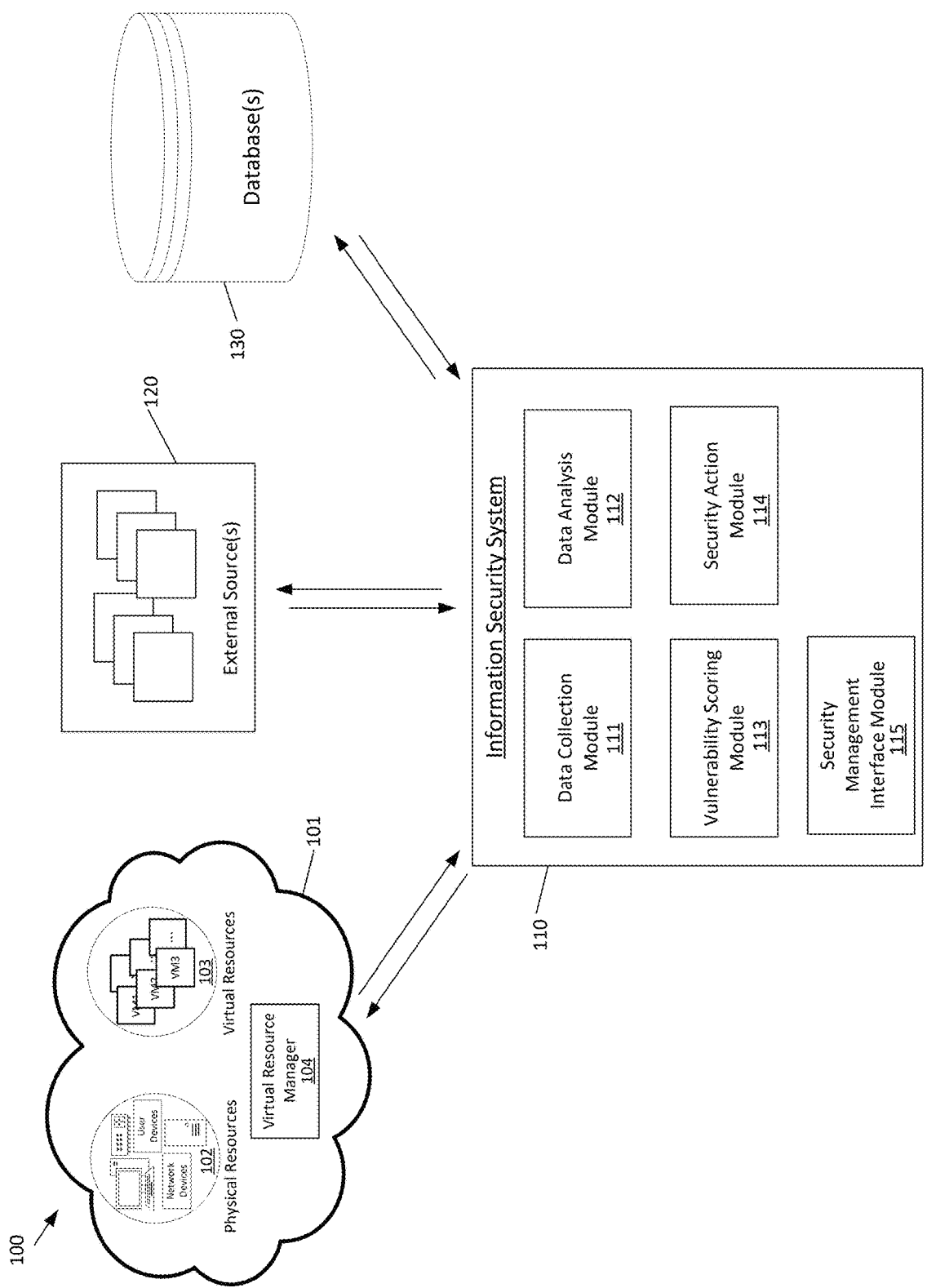
FIG. 1 shows an illustrative environment 100 in which an information security system may operate, in accordance with some embodiments of the technology described herein.

As discussed above, it is important to analyze cybersecurity vulnerabilities in computing environments to protect the data, software, and infrastructure of such environments. One aspect of analyzing cybersecurity vulnerabilities is determining the degree of risk presented by different cybersecurity vulnerabilities and taking action (e.g., notifying relevant individuals and/or automatically performing one or more mitigations) to mitigate (e.g., reduce or eliminate) the risk posed by the vulnerabilities to the computing environment.

The inventor(s) have recognized that conventional techniques for analyzing cybersecurity vulnerabilities in computing environments may be improved upon. Conventional techniques for analyzing cybersecurity vulnerabilities do not incorporate the current degree of exploitation of cybersecurity vulnerabilities, and therefore do not provide accurate indications of the current risk posed by cybersecurity vulnerabilities. These inaccurate representations of current vulnerability risk limit the ability to effectively address high risk vulnerabilities in computer environments.

For example, with conventional techniques, users may be notified of new or existing vulnerabilities to address, however because of the vast number of cybersecurity vulnerabilities in existence the users are not able to efficiently sift through these notifications to determine which vulnerabilities actually require immediate attention. This may result in computing environment users allocating cybersecurity resources and efforts to addressing vulnerabilities with low current risks, leaving the computing environment exposed to vulnerabilities with high current risks.

Some conventional analysis techniques are static and determine a single and fixed level of risk for a cybersecurity vulnerability, which does not change with the availability of new information, to reflect the current risk posed by the vulnerability. For example, a static analysis method will not change a vulnerability risk level in response to important information related to the vulnerability, such as when tools to detect and mitigate that vulnerability have been adopted or when a different and more effective technique for exploitation becomes available. As a result, these static analysis techniques often inaccurately determine the risk posed by a cybersecurity vulnerability because they do not integrate the most up-to-date information about the degree to which it is possible to exploit a particular vulnerability.

Other conventional techniques may perform dynamic analyses of cybersecurity vulnerabilities. However, these systems merely update the risk of a vulnerability as new exploits become available, but do not expressly assess the current degree or type of exploitation of a vulnerability and take this data into account when determining the risk that the vulnerability presents.

The inventor(s) have recognized that conventional cybersecurity vulnerability analysis techniques may be improved by incorporating real-time intelligence and information about the degree of current exploitation of vulnerabilities into the analysis. The inventor(s) have appreciated that data related to the degree of current exploitation of vulnerabilities provides a more accurate indication of the actual risk posed by different vulnerabilities than conventional techniques which fail to take this information into account.

Accordingly, the inventor(s) have developed a new technique for analyzing cybersecurity vulnerabilities which integrates data related to a current degree of exploitation of cybersecurity vulnerabilities into the analysis. The technique involves gathering information related to a cybersecurity vulnerability, including information about a current degree of exploitation of the cybersecurity vulnerability, and using that information to determine a vulnerability score indicative of the level of risk posed by cybersecurity vulnerability. The technique may be performed for multiple cybersecurity vulnerabilities which may be present in a computing environment. The scores determined for multiple vulnerabilities may be used to prioritize specific vulnerabilities to be addressed within the computing system. As a result of analyzing cybersecurity vulnerabilities using information about the degree of current exploitation of the vulnerabilities, and unlike conventional techniques, the techniques developed by the inventor(s) provide more accurate indications of the current risk posed by cybersecurity vulnerabilities and allow for the more efficient allocation of cybersecurity resources and efforts to address vulnerabilities. Vulnerabilities may be more efficiently addressed by prioritizing specific security actions to eliminate or reduce high risk vulnerabilities.

In some embodiments, the techniques described herein may be implemented via an information security system deployed to a computing environment. In some embodiments, an information security system is external to the computing environment to which it is deployed. In some embodiments, an information security system is contained within the computing environment to which it is deployed. In some embodiments, an information security system may include one or more modules external to and one or more modules contained within the computing environment to which it is deployed.

In some embodiments, computing environments may include addressable resources. Examples of computing environment resources include assets, storage resources (e.g., AWS S3 bucket), a queue (e.g., a queue provided by a cloud service), and/or any other type of data structure, in-memory object, software and/or hardware solution from which data may be collected and whose state may be monitored. An "asset" of a computing environment may refer to any addressable physical or virtual device part of the computing environment. An addressable physical device part of the computing environment may be referred to as a "physical resource." An addressable virtual device part of the computing environment may be referred to as a "virtual resource."

Resources part of a computing environment may be interconnected by one or more computer networks and each resource may have one or more addresses on the computer network(s). Each address may be of any suitable type and may be used to enable communication to/from a resource on the computer network(s). Non-limiting examples of addresses include an IP address (e.g., an IPV4 or an IPV6 address), a MAC address, an FTP address, an HTTP address, and a hostname. As can be appreciated from the foregoing, when a resource has multiple addresses, different addresses may be used to enable communication to/from the resource using different communication protocols. Though, some communication protocols may require use of multiple addresses (e.g., IP address and MAC address). Some types of addresses may be assigned by a computer network (e.g., an IP address). Other types of addresses are not assigned by the network and are particular to a device (e.g., a MAC address).

In some embodiments, cybersecurity vulnerabilities associated with computing environment resources may be analyzed. Examples of cybersecurity vulnerabilities include, but are not limited to but not limited to, known software bugs, out-of-date software applications versions, unpatched software applications, corrupted data, unencrypted data, improper access permissions for resources, misconfigurations (e.g., settings that are incorrect or inconsistent with security policies such as network settings, software application settings, operating system settings, etc.), computer viruses, malware (e.g., adware, ransomware, spyware, trojans, bots, etc.), and/or any other cybersecurity vulnerability.

In some embodiments, an information security system may maintain, or access data related to cybersecurity vulnerabilities. In some embodiments, the data is maintained in one or more databases contained within or accessible to the information security system. In some embodiments, the one or more databases may include any number of cybersecurity vulnerabilities for analysis, for example at least 10 cybersecurity vulnerabilities, at least 50 cyber security vulnerabilities, at least 100 cybersecurity vulnerabilities, at least 1000 cybersecurity vulnerabilities, at least 10,000 cybersecurity vulnerabilities, at least 100,000 cybersecurity vulnerabilities, at least 500,000 cybersecurity vulnerabilities, or at least 1 million cybersecurity vulnerabilities. In some embodiments, the data related to cybersecurity vulnerabilities includes information related to the source of a vulnerability, the impact of exploitation of the vulnerability (e.g. the resources that could be impacted, the data that could be obtained, the operability of the computing environment following exploitation), an/or the access requirements to exploit the vulnerability within the computing environment.

In some embodiments, when analyzing a particular cybersecurity vulnerability, an information security system may identify the cybersecurity vulnerability from the maintained data related to the cybersecurity vulnerabilities. The information security system may select the vulnerability for analysis and perform proceed to analyze the vulnerability. The information security system may repeat this for some or all of the maintained cybersecurity vulnerabilities.

In some embodiments, cybersecurity vulnerabilities are analyzed at regular intervals. For example, an information security system may perform an analysis of cybersecurity vulnerabilities weekly, daily, or multiple time per day (e.g. every 12 hours, every 6 hours, every 2 hours or hourly), among any other suitable time intervals. In some embodiments, a vulnerability may be analyzed in response to the information security system receiving information about the vulnerability. For example, the information security system may receive information indicating the vulnerability is seeing increased exploitation and therefore the vulnerability is analyzed to update the system as to the current risk posed by the vulnerability. In some embodiments, vulnerabilities may be analyzed more or less frequently based on the risk posed. For example, a vulnerability determined by the information security system to be a high risk vulnerability may be analyzed more frequently than a vulnerability determined by the information security system to be a lower risk vulnerability. In some embodiments, a vulnerability having a risk score above a threshold level, indicating it is a high risk vulnerability, may be analyzed at a first rate, and a second vulnerability having a risk score below the threshold level may be analyzed at a second rate, slower than the first rate. In some embodiments, a vulnerability having a risk score indicating it is of critical severity may be analyzed at a first rate, a vulnerability having a risk score indicating it is of high severity may be analyzed at a second rate, a vulnerability having a risk score indicating it is of medium severity may be analyzed at a third rate, and a vulnerability having a risk score indicating it is of low severity may be analyzed at a fourth rate, with the first rate being the fastest, the second rate being the second fastest, the third rate being the third fastest and the fourth rate being the slowest.

In some embodiments, analyzing a cybersecurity vulnerability involves obtaining and analyzing data related to one or more factors of the cybersecurity vulnerability. In some embodiments, factors of the cybersecurity vulnerability include one or more of: a factor indicative of whether the cybersecurity vulnerability has been exploited, a factor indicative of whether the cybersecurity vulnerability has been observed in ransomware attacks, a factor indicative of whether the cybersecurity vulnerability has been observed in a nation-state sponsored attack, a factor indicative of presence of the cybersecurity vulnerability in a cybersecurity provider database, a factor indicative of presence of the cybersecurity vulnerability in Cybersecurity and Infrastructure Security Agency (CISA) Known Exploited Vulnerabilities (KEV) Catalog, a factor indicative of ease of exploitation of the cybersecurity vulnerability, a factor indicative of whether a default configuration of the resource is exposed to the cybersecurity vulnerability, a factor indicative of whether authentication by the computing environment is required for exploitation of the cybersecurity vulnerability, a factor indicative of availability of a public exploit of the cybersecurity vulnerability, and a factor indicative of the availability of the cybersecurity vulnerability in a cybersecurity vulnerability testing platform.

In some embodiments, the one or more factors may include a factor indicative of whether the cybersecurity vulnerability has been exploited. The exploitation of vulnerabilities is an important factor for consideration because it indicates the vulnerability has been used in past attacks and can be used in future attacks. In some embodiments, data related to whether the cybersecurity vulnerability has been exploited may include an indicator of exploitation, an indication of the frequency of exploitation of the vulnerability, an indication of the last time the vulnerability was reported to be exploited, and an indication of commonalities of targets of the exploitations (e.g. location, company size, company type, business sector etc.), among other information related to the vulnerability.

In some embodiments, the one or more factors may include a factor indicative of whether a cybersecurity vulnerability has been observed in a ransomware attack. Ransomware attacks are becoming more prevalent and sophisticated and pose significant risks to computing environments. Ransomware attacks can be costly to businesses who may lose productivity, use of their computing environments, access to data and functionality. Therefore, the exploitation of a vulnerability in a ransomware attack is an important consideration for determining risk posed by the vulnerability. In some embodiments, data related to exploitation of a vulnerability in a ransomware attack may include an indication of exploitation in a ransomware attack, an indication of the frequency of reporting of the vulnerability in ransomware attacks, an indication of the last time the vulnerability was reported to be exploited in a ransomware attack, and an indication of commonalities of targets of the exploitations in ransomware attacks (e.g. location, company size, company type, business sector etc.), among other information related to the vulnerability.

In some embodiments, the one or more factors may include a factor indicative of whether a cybersecurity vulnerability has been observed in a nation-state sponsored attack. Nation-state sponsored attacks are becoming more prevalent and are carried out by sophisticated actors. These attacks commonly target computing environments of important organizations and/or key infrastructure of computing environments. Therefore, the exploitation of a vulnerability in a nation-state sponsored attack is an important consideration for determining risk posed by the vulnerability. In some embodiments, data related to exploitation of a vulnerability in a nation-state sponsored attack may include an indication of exploitation in a nation-state sponsored attack, an indication of the frequency of reporting of the vulnerability in nation-state sponsored attacks, an indication of the last time the vulnerability was reported to be exploited in a nation-state sponsored attack, and an indication of commonalities of targets of the exploitations in nation-state sponsored attacks (e.g. location, company size, company type, business sector etc.), among other information related to the vulnerability.

In some embodiments, the one or more factors may include a factor indicative of presence of a cybersecurity vulnerability in a cybersecurity provider database. Cybersecurity providers, such as Rapid7, will prioritize and store information related to important vulnerabilities in databases. The presence of a vulnerability in a cybersecurity provider database indicates the vulnerability is likely to be high risk, have known exploits, and/or have known patches, and therefore is an important consideration for determining risk posed by the vulnerability. In some embodiments, data related to the presence of a cyber security vulnerability in a cybersecurity provider database may include an indication of the presence of the vulnerability in one or more cybersecurity provider databases, and any data stored in the cybersecurity provider databases related to the vulnerability such as data on an impact of the vulnerability, the access required for exploitation of the vulnerability and data related to known exploitations, among other data.

In some embodiments, the one or more factors may include a factor indicative of the presence of a cybersecurity vulnerability in the Cybersecurity and Infrastructure Security Agency (CISA) Known Exploited Vulnerabilities (KEV) Catalog. The CISA KEV catalog maintains a list of vulnerabilities that have been exploited in the wild. Therefore, the presence of vulnerabilities in the CISA KEV catalog provides an indication of the risk associated with vulnerabilities, as vulnerabilities are higher risks to computing environments when they have been successfully exploited.

In some embodiments, the one or more factors may include a factor indicative of ease of exploitation of the cybersecurity vulnerability. The ease of exploitation is important to consider because it indicates the likelihood of a successful attack. This allows for the identification of high risk vulnerabilities that are likely to be successfully exploited and vulnerabilities that are lower risk because they are unlikely to be successfully exploited. In some embodiments the data related to the ease of exploitation may include data related to the time needed for exploitation of the vulnerability, a level of access to the computing environment required for exploitation of the vulnerability, security permissions required to exploit the vulnerability, among other indications of the ease of exploitation of a cybersecurity vulnerability.

In some embodiments, the one or more factors may include a factor indicative of whether a default configuration of a resource is exposed to a cybersecurity vulnerability. This factor provides an indication of vulnerabilities which are particularly risky because they can be more easily exploited. This factor additionally provides an indication of specific resources which may be prioritized for remediation because their current configurations are open to cybersecurity vulnerabilities.

In some embodiments, the one or more factors may include a factor indicative of whether authentication by the computing environment is required for exploitation of a cybersecurity vulnerability. This factor provides an indication of the risk posed by the vulnerability, as vulnerabilities which do not require authentication may be more easily exploited and pose higher risks to computing environments. In some embodiments, the data related to whether authentication is required for exploitation may include an indication of the level of authentication required for exploitation of the vulnerability, and an indication of access permissions required for exploitation of the vulnerability, among other indications related to authentication requirements for exploitation.

In some embodiments, the one or more factors may include a factor indicative of availability of a public exploit of the cybersecurity vulnerability. This factor provides an indication of risk of a cybersecurity vulnerability as the presence of a public exploit shows the vulnerability is widely tracked and is more likely to be exploited compared to vulnerabilities which are theoretical. In some embodiments, data related to the presence of a public exploit may include an indication of whether a public exploit is available for a cybersecurity vulnerability, an indication of the length of time an exploit has been available, and an indication of the risk posed by available exploits, among other data related to public exploits of vulnerabilities.

In some embodiments, the one or more factors may include a factor indicative of the availability of a cybersecurity vulnerability in a cybersecurity vulnerability testing platform. Cybersecurity vulnerability testing platforms, for example Metasploit, are used to test whether a computing environment is susceptible to different cybersecurity vulnerabilities. The presence of a particular vulnerability in a cybersecurity testing platform indicates that the vulnerability is a known risk and therefore should be considered for potential mitigation. Additionally, the presence of a vulnerability in a cybersecurity vulnerability testing platform indicates the computing environment may be tested to determine its susceptibility and that there is likely to be one or more corrective actions which may mitigate the risk of the vulnerability. In some embodiments, data related to the availability of a cybersecurity vulnerability in a cybersecurity vulnerability testing platform may include an indication of whether a vulnerability is available in one or more cybersecurity vulnerability testing platforms, and an indication of the presence of known corrective actions for the vulnerability, among other data related to the availability of a vulnerability in a cybersecurity vulnerability testing platform.

In some embodiments, the data related to the one or more factors of cybersecurity vulnerabilities may be obtained by an information security system from one or more sources. In some embodiments, an information security system may obtain data from storage contained within the information security system or directly connected to the information security system. In some embodiments, an information security system may obtain data from one or more sources external to the information security system. In some embodiments, an information security system may obtain data from sources internal to the information security system, directly connected to the information security system and sources external to the information security system.

In some embodiments, the external sources may include one or more of: external databases, websites, cybersecurity reporting sources, and threat intelligence feeds, among other data sources. In some embodiments, the external databases may include databases managed by cybersecurity service providers, universities, non-profit organizations, and government organizations, among other databases which contain cybersecurity vulnerability data. Embodiments of such databases include CISA KEV catalog, and the National Vulnerability Database. In some embodiments, the databases include proprietary databases accessible to the information security system. In some embodiments, the websites may include one or more of: websites hosted or managed by cybersecurity service providers, cybersecurity related forums, or social media websites, among other websites which contain information related to cybersecurity vulnerabilities. Examples of such websites include AttackerKB.com. In some embodiments, the cybersecurity reporting sources include one or more of: reporting sources managed by cybersecurity service providers, non-profit reporting sources, and government reporting sources, among other reporting sources which report information related to cybersecurity vulnerabilities. Examples of such reports include the Rapid7 Vulnerability Intelligence Report, and CISA Cybersecurity Alerts & Advisories. In some embodiments, the threat intelligence feeds include threat intelligence feeds managed by cybersecurity service providers, threat intelligence feeds managed by non-profit organizations and threat intelligence feeds managed by government organizations, among other threat intelligence feeds. Examples of threat intelligence feeds include Rapid7 IDR Alerts, Rapid7 MDR Alerts, InfraGard, Alien Vault, and Cyber Threat Information Sharing-Automated Indicator Sharing.

In some embodiments, the information security system may send requests to external sources to obtain data related to factors of a cybersecurity vulnerability. For example, the information security system may make one or more API calls to external sources to obtain data related to the factors of a cybersecurity vulnerability. In some embodiments, the information security system may make such requests on a set schedule, for example, once per day, every 12 hours, every 6 hours, every 2 hours or hourly. In some embodiments, the external sources may automatically send data related to factors of cybersecurity vulnerabilities to the information security system.

In some after obtaining data related to one or more factors of a cybersecurity vulnerability, the information security system analyzes the one or more factors. In some embodiments, the information security system determines a weight for each of the one or more factors received. The weight may be indicative of the risk posed by the cybersecurity vulnerability to a computing environment. In some embodiments, a higher weight indicates a greater risk. In some embodiments, a lower weight indicates a greater risk. In some embodiments, each of the factors receives a respective weight. In some embodiments, multiple factors contribute to a single weight. In some embodiments, a factor may contribute to multiple weights. In some embodiments, the weights may be binary values for the respective factors. In some embodiments, the weights may be determined based on the obtained data related to the factor. In some embodiments, weights may depend on the importance of the related factor to the risk posed to the computing environment, for example a factor indicating higher risk may have a higher associated weight.

In some embodiments a weight associated with the factor indicative of whether a cybersecurity vulnerability has been exploited is determined based on whether exploitation has occurred. In some embodiments the weight is determined based on the degree, recency, or targets of the exploitation. The weight may indicate a high risk when the cybersecurity vulnerability has been exploited, and may indicate an increased risk when the exploitation was more extreme, recent, frequent or directed to similar targets to the computing environment.

In some embodiments a weight associated with the factor indicative of whether a cybersecurity vulnerability has been observed in ransomware attacks is determined based on whether the vulnerability has been observed in a ransomware attack. In some embodiments the weight is determined based on the degree, recency, or targets of the attacks. The weight may indicate a high risk when the cybersecurity vulnerability has been in a ransomware attack, and may indicate an increased risk when the attack was more extreme, recent, frequent or directed to similar targets to the computing environment.

In some embodiments a weight associated with the factor indicative of whether a cybersecurity vulnerability has been observed in a nation-state sponsored attack is determined based on whether the vulnerability has been observed in a nation-state sponsored attack. In some embodiments the weight is determined based on the degree, recency, or targets of the attack. The weight may indicate a high risk when the cybersecurity vulnerability has been observed in a nation-state sponsored attack, and may indicate an increased risk when the attack was more extreme, recent, frequent or directed to similar targets to the computing environment.

In some embodiments, a weight associated with the factor indicative of presence of the cybersecurity vulnerability in a cybersecurity provider database is determined based on whether the cybersecurity vulnerability is present in the cybersecurity provider database. In some embodiments, the weight is determined based on a number of databases the vulnerability is found in or information related to the vulnerability obtained from the database(s). The weight may indicate a high risk when the cybersecurity vulnerability is present in a cybersecurity provider database and may indicate an increased risk when the vulnerability is found in multiple databases, or the database indicates it is high risk.

In some embodiments, a weight associated with the factor indicative of the presence of the cybersecurity vulnerability in Cybersecurity and Infrastructure Security Agency (CISA) Known Exploited Vulnerabilities (KEV) Catalog is determined based on whether the vulnerability is listed in the CISA KEV Catalog. The weight may indicate a high risk when the cybersecurity vulnerability is present in the CISA KEV Catalog.

In some embodiments, a weight associated with the factor indicative of ease of exploitation of the cybersecurity vulnerability is determined based on an ease of exploitation determined by the information security system based on the obtained data. The weight may indicate a high risk when the cybersecurity vulnerability is determined to be easy to exploit.

In some embodiments, a weight associated with the factor indicative of whether a default configuration of the resource is exposed to the cybersecurity vulnerability is determined based on whether the default configuration is exposed. The weight may indicate a high risk when the cybersecurity vulnerability can be exploited in a default configuration of the resource.

In some embodiments, a weight associated with the factor indicative of whether authentication by the computing environment is required for exploitation of the cybersecurity vulnerability is determined based on whether authentication is required. In some embodiments, the weight is determined based on the degree of authentication required for exploitation. The weight may indicate a high risk when the cybersecurity vulnerability does not require authentication or requires or may indicate risk inversely proportional to a level of authentication required, such as lower risk when a high level of authentication is required.

In some embodiments, a weight associated with the factor indicative of availability of a public exploit of the cybersecurity vulnerability is determined based on whether a public exploit of the vulnerability is available. In some embodiments, the weight is determined based on the length of time the exploit has been available. The weight may indicate a high risk when there is a public exploit available for the cybersecurity vulnerability and may indicate increased risk based on the recency of the exploit.

In some embodiments a weight associated with the factor indicative of the availability of the cybersecurity vulnerability in a cybersecurity vulnerability testing platform is determined based on whether the vulnerability is available in a cybersecurity testing platform. In some embodiments, the weight is based on whether there are known corrective actions associated with the vulnerability. The weight may indicate a high risk when the cybersecurity vulnerability is present in a cybersecurity vulnerability testing platform.

In some embodiments, the weights for the vulnerability factors are determined based on the risk related to the factor. For example, factors associated with greater risks to computing environments may have higher risks. In some embodiments, the highest risk factors are the factor indicative of whether the cybersecurity vulnerability has been exploited and the factor indicative of whether the vulnerability is listed in the CISA KEV catalog, followed by the factor indicative of whether the cybersecurity vulnerability has been observed in ransomware attacks, followed by the factor indicative of whether the cybersecurity vulnerability has been observed in a nation-state sponsored attack, followed by the factor indicative of presence of the cybersecurity vulnerability in a cybersecurity provider database, followed by the factor indicative of ease of exploitation of the cybersecurity vulnerability, followed by the factor indicative of whether the resource is exposed in the default configuration, followed by the factor indicative of whether authentication by the computing environment is required for exploitation of the cybersecurity vulnerability, followed by the factor indicative of availability of a public exploit of the cybersecurity vulnerability.

In some embodiments, an administrator of the information security system may select how the weights for the vulnerability factors are determined.

In some embodiments, after determining weights for the one or more factors, a current risk score is determined for a cybersecurity vulnerability using the determined factor weights. In some embodiments, the current risk score is determined by adding the determined factor weights. In some embodiments, the current risk score is determined by multiplying the determined factor weights. In some embodiments, a base risk score is determined for the vulnerability, and the base risk score is adjusted using the factor weights. In some embodiments, the base risk score is adjusted by adding the factor weights to the base risk score. In some embodiments, the base risk score is adjusted by multiplying by the factor weights. In some embodiments, the base score is adjusted by a combination of adding or multiplying the factor weights. In some embodiments, the base risk score is determined using information related to the cybersecurity vulnerability, which may be maintained by the information security system or obtained from one or more external sources. In some embodiments, the information used to determine the base risk score includes information related to the vulnerability including one or more of the: access vector, access complexity, authentication requirements, confidentiality impact, integrity impact, availability impact, exploitability, remediation level, report confidence, collateral damage potential, target distribution, confidentiality requirement, integrity requirement and availability requirement. In some embodiments, the base risk score is the Common Vulnerability Scoring System (CVSS) score associated with the vulnerability. In some embodiments, the base risk score is the CVSS V2 score. In some embodiments, the base risk score is the CVSS V3 score.

In some embodiments, the current risk score for a vulnerability is capped at a maximum level. In some embodiments the current risk score for a vulnerability is on a scale of 0-10. In some embodiments, current risk score ranges may be used to indicate the relative risks of cybersecurity vulnerabilities. In some embodiments, current risk scores from 0.0-3.9 may indicate low severity, current risk scores from 4.0-6.9 may indicate medium severity, current risk scores from 7.0-8.9 may indicate high severity, and current risk scores from 9.0-10.0 may indicate critical severity.

In some embodiments, after a current risk score is determined for a cybersecurity vulnerability, the current risk score is stored in one or more databases connected to the information security system. In some embodiments, the information security system may perform an analysis on the trends in the risk of a particular cybersecurity vulnerability. In some embodiments, data related to the trend in risk of a vulnerability may be used in determining the current risk score for a vulnerability. For example, a vulnerability having a sharp increase in risk may be weighted as even riskier because of the sudden increase.

In some embodiments, the current risk scores may be updated at different time intervals, for example, daily, every 12 hours, every 6 hours, every 2 hours or hourly.

In some embodiments, the current risk score for a vulnerability may be updated in real-time based on information obtained related to the vulnerability. For example, the current risk score for a vulnerability may be updated in response to an external source providing updated data related to a factor of the vulnerability or new data being obtained relating to a vulnerability indicating a factor of the vulnerability has changed. In some embodiments, the information security system may analyze data obtained related to factors of a vulnerability to determine if the data has changed, and in response to determining the data has changed, the current risk score for the vulnerability is recalculated.

In some embodiments, the information security system may prioritize cybersecurity vulnerabilities for corrective actions based on the determined current risk scores. For example, the information security system may generate a vulnerability report in which cybersecurity vulnerabilities are organized based on the risk posed to the information security system. In some embodiments, the information security system may include only those vulnerabilities which are high or critical risks in a report.

In some embodiments, the information security system may perform one or more security actions based on the determined current risk scores. In some embodiments, the system may automatically perform the one or more security actions, without user input indicating the one or more actions are to be performed. In some examples, the system may perform the one or more security actions in response to receiving a user input indicating the one or more actions are to be performed. In some embodiments, the one or more security actions may include generating a vulnerability report, recommending corrective actions for one or more cybersecurity vulnerabilities, or automatically performing one or more corrective actions to address one or more cybersecurity vulnerabilities. In some embodiments, the corrective actions may be recommended or performed for high or critical risk vulnerabilities. Corrective actions may be performed automatically (e.g., by an information security system) or manually (e.g., by one or more system administrators). Non-limiting examples of corrective actions include updating software (e.g., by installing a newer version of the software, applying a patch), changing the network configuration of a resource, changing the configuration of one or more software applications executing on the resource, changing the configuration of an operating system executing on the resource, changing one or more permissions for the resource, deleting malware, removing corrupted files or data, taking a physical offline, killing an instance of a virtual resource, and blocking communications to and/or from the resource.

In some embodiments, the information security system may identify one or more cybersecurity vulnerabilities based on the current risk scores determined for the cybersecurity vulnerabilities to perform security actions based on. In some embodiments, these vulnerabilities may be selected because they have current risk scores exceeding a threshold current risk score. In some embodiments, a subset of vulnerabilities may be selected based on their current risk scores, for example the top N riskiest vulnerabilities may be selected for performing security actions.

The dynamic scoring of cybersecurity vulnerabilities using information related to the current exploitation of the vulnerabilities provides advantages over conventional methods of analyzing cybersecurity vulnerabilities. For example, information security system administrators may better prioritize remediation efforts to focus on those vulnerabilities which are currently most critical and are an active threat to the computing environment. This increases the speed at which severe vulnerabilities are responded to and ensures efficient addressing of vulnerabilities. In addition, addressing vulnerabilities based on the current risk reduces the volume of seemingly high risk vulnerabilities, as the vulnerabilities which conventional systems determine to be risky but, in reality, pose little threat are not weighted highly. Therefore, corrective actions may be prioritized based on current risk and the computing environment is not left exposed to high risk vulnerabilities during correction of lower risk vulnerabilities improperly current risk scored highly.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1 shows an illustrative environment 100 in which an information security system may operate, in accordance with some embodiments of the technology described herein. The environment 100 includes a computing environment 101, an information security system 110, external source(s) 120, and database(s) 130.

The computing environment 101 is shown as a cloud computing environment, however, it may be any suitable computing environment, as described herein. The computing environment includes resources including physical resources 102 and virtual resources 103. Examples of computing environment resources are described herein. The computing environment additionally includes a virtual resource manager 104 which controls the access to and deployment of virtual resources 103 within the computing environment 101. Virtual resource manager 104 may comprise software for managing virtual resources 103 (e.g., by launching, monitoring, allocating resources to, shutting down VM instances). Though these are shown separately within FIG. 1, this is done for clarity of presentation, as virtual resources 103 and virtual resource manager 104 are software resources that execute on one or more physical resources 102.

The computing environment 101 may include any suitable number of resources of any suitable type. For example, physical resources 102 may include tens, hundreds, thousands, tens of thousands, hundreds of thousands, or millions, of addressable physical resources. As another example, virtual resources 103 may include tens, hundreds, thousands, tens of thousands, hundreds of thousands, millions, tens of millions, or hundreds of millions of virtual resources. As computing services continue to evolve and develop, a computing environment may include an even greater number of resources, and aspects of the technology described herein are not limited in this respect.

The computing environment 101 is connected to information security system 110. The information security system 110 may be configured to provide information security services with respect to the computing environment 101. Information security system 110 is shown as external to computing environment 101, however in some embodiments, one or more module(s) of information security system 110 may be deployed within computing environment 101.

The information security system 110 includes a data collection module 111, which communicates with the computing environment 101, external sources 120 and databases 130 to send and/or receive data, for example data related to cybersecurity vulnerabilities and features of cybersecurity vulnerabilities, as described herein. The data collection module 111 may execute API calls to the external sources 120 and databases 130 to obtain data, or may receive data as it is automatically transmitted, as described herein.

The information security system 110 includes a data analysis module 112 which may analyze data obtained by the data collection module. The data analysis may provide different indications of risk related to cybersecurity vulnerabilities, as described herein. The data analysis module 112 may determine one or more weights for a cybersecurity vulnerability based on data obtained by the data collection module 111, as described herein.

The information security system 110 includes vulnerability scoring module 113, which may determine one or more scores for vulnerabilities of the computing environment 101.

The vulnerability scoring module 113 may use weights determined by the data analysis module 112 to determine the current risk score for a vulnerability, as described herein. The vulnerability scoring module 113 may determine scores indicative of the current risk posed by cybersecurity vulnerabilities, as described herein. The vulnerability scoring module may determine a base score for a vulnerability and adjust the base score using the weights determined by the data analysis module, as described herein.

The information security system 110 includes security action module 114 which may perform one or more actions based on the score(s) determined by vulnerability scoring module 113. For example, the security action module may generate vulnerability reports, prioritize vulnerabilities for corrective actions, determine corrective actions to be performed, automatically perform corrective actions, among other security actions as described in herein.

The security action module 114 may provide information on vulnerabilities, for example vulnerability reports or suggested corrective actions to security management interface module 115 of the information security system 110. The security management interface module 115 may let one or more administrators of the information security system 110 to view and address vulnerabilities, for example by performing one or more corrective actions or by prioritizing vulnerabilities for corrective actions.

The information security system 110 may communicate with one or more external sources 120 to obtain data for the analysis of cybersecurity vulnerabilities, as described herein. The external sources 120 may include external databases, websites, cybersecurity reporting sources, and threat intelligence feeds, as described herein.

The information security system 110 may additionally communicate with one or more databases 130 to obtain data for the analysis of cybersecurity vulnerabilities, as described herein. In some embodiments, the databases include data related to vulnerabilities of the computing environment 101, for example historic scores for vulnerabilities, data related to factors of vulnerabilities, base scores for vulnerabilities, among other data used in scoring and analyzing vulnerabilities, as described herein. In some embodiments, the information security system 110 stores calculated scores for vulnerabilities in the databases 130.

Figure 2:
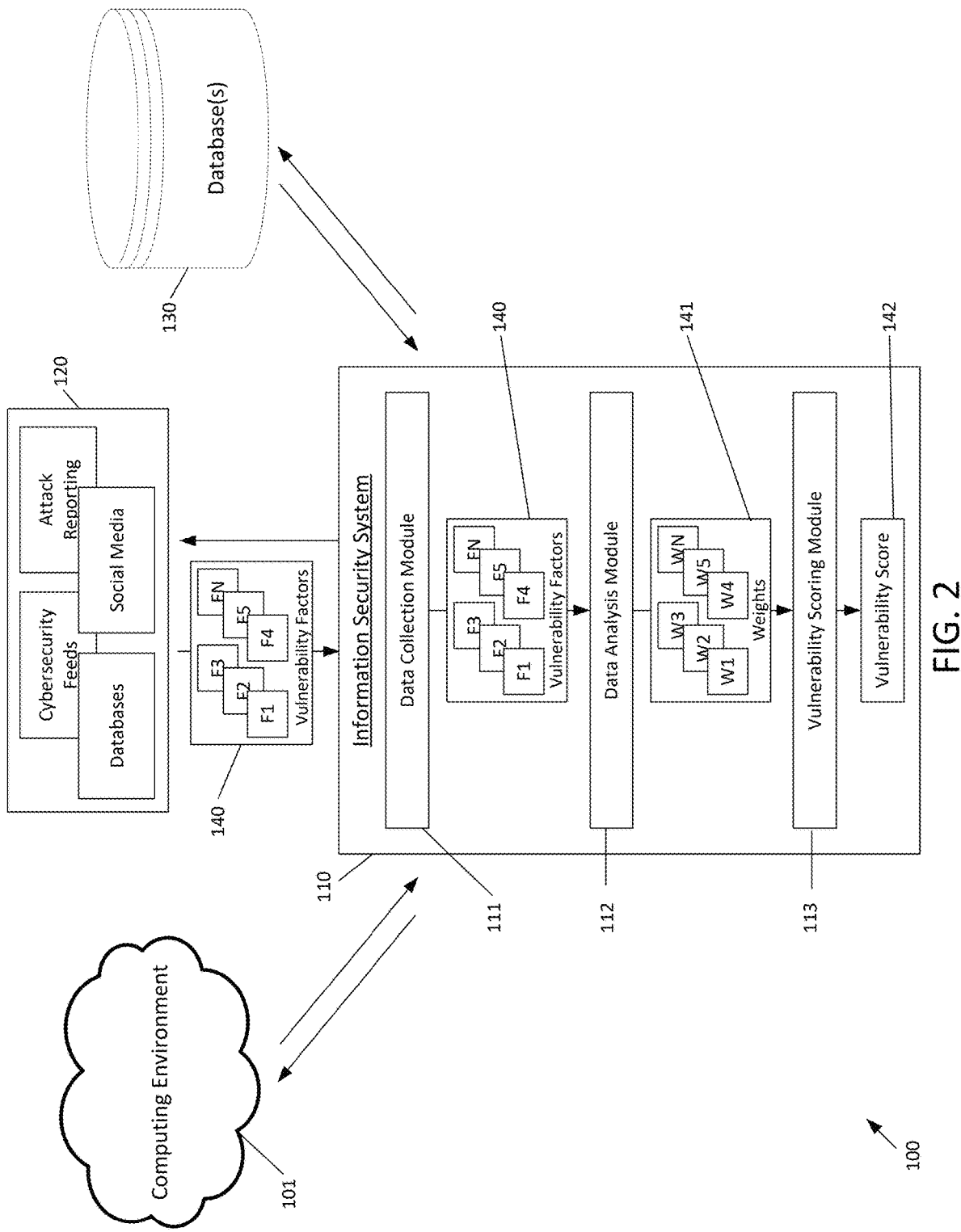
FIG. 2 shows an illustrative example of an information security system analyzing a cybersecurity vulnerability, in accordance with some embodiments of the technology described herein.

FIG. 2 shows an illustrative example of an information security system analyzing a cybersecurity vulnerability, in accordance with some embodiments of the technology described herein.

The information security system 110 may select a vulnerability to analyze from database(s) 130. The data collection module 111 may then obtain data related to vulnerability factors 140 from the external sources 120. As shown, the external sources include databases, cybersecurity feeds, attack reporting and social media, however, may include greater or fewer external sources, as described herein. The data related to vulnerability factors includes data for factors F1-FN but may include any number of factors as described herein.

In some embodiments, the information security system may obtain information related to a vulnerability automatically from external sources 120. In some embodiments, after obtaining information automatically from external sources, the information security system 110 may obtain additional data related to the factors 140 vulnerability from the external sources 120 or databases 130. The information security system may analyze the vulnerability in real-time in response to the automatically obtained information to allow for a fast response to any new threat posed by the vulnerability.

In some embodiments, the data related to the vulnerability factors 140 may be analyzed to determine if one or more factors has changed since a previous analysis of the vulnerability. In some embodiments, if a factor has not changed since a previous analysis, the factor is not analyzed further by the information security system, for example a new weight is not determined for the factor. In some embodiments, if no factors have changed since a previous analysis, the vulnerability may not be analyzed further, and the previously determined score may be maintained.

After obtaining data related to vulnerability factors 140, the data collection module 111, passes the data related to the vulnerability factors 140 to the data analysis module 112. The data analysis module determines weights 141 for the vulnerability based on the data related to the vulnerability factors 140. The weights may be determined as described herein, for example based on the data related to the factors. In some embodiments, each factor is used to generate a respective weight. Weights W1-WN are shown however any number of weights may be determined, as described herein.

The weights are passed from data analysis module 112 to vulnerability scoring module 113, which determines the vulnerability current risk score 142 for the cybersecurity vulnerability. The vulnerability current risk score may be determined as described herein, for example by determining a base score and adjusting the base score using weights 141. The vulnerability current risk score 142 may then be provided to one or more other modules of the information security system 110 to recommend and/or perform security actions, as described herein.

In some embodiments, the current risk score 142 may additionally be stored in the databases 130 for future use or analysis by the information security system. For example, the information security system 110 may perform a trend analysis of a given vulnerability, where the change in vulnerability current risk score over time is analyzed to determine whether the vulnerability is becoming more or less risky and whether security actions should be prioritized based on the trend.

In some embodiments, the process shown in FIG. 2 may be repeated for multiple vulnerabilities stored in databases 130, as described herein. In some embodiments, the process of FIG. 2 may be performed in response to obtaining data from one or more sources related to a vulnerability. In some embodiments, the process of FIG. 2 may be triggered by an administrator of the information security system 110, who may select one or more vulnerabilities for analysis.

Figure 3:
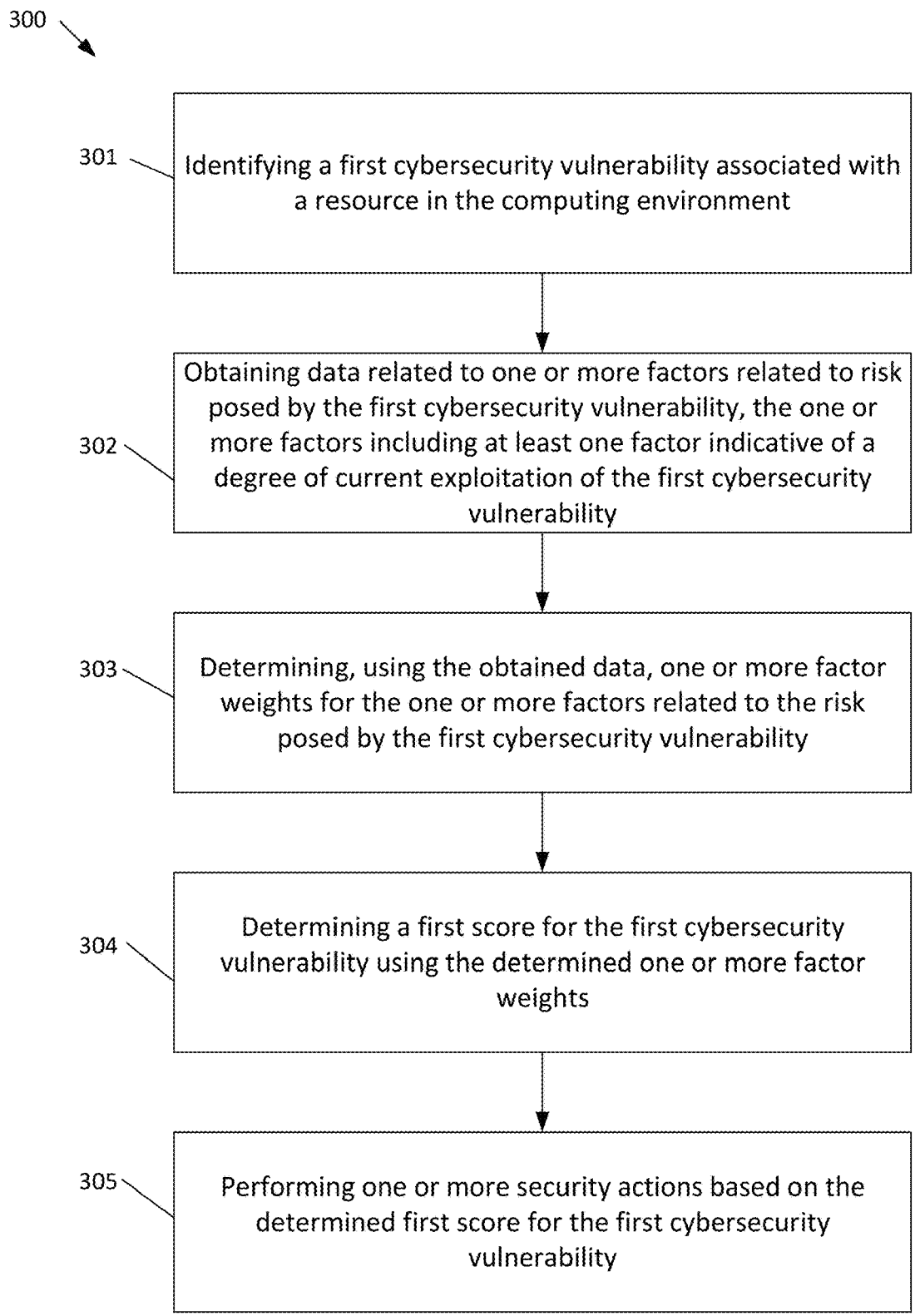
FIG. 3 is a flow chart of an illustrative process carried out by an example information security system, analyze cybersecurity vulnerabilities, in accordance with some embodiments of the technology described herein.

FIG. 3 is a flow chart of a process carried out by an example information security system, analyze cybersecurity vulnerabilities, in accordance with some embodiments of the technology described herein. The process 300 may be performed by any suitable computing device. For example, in some embodiments, the process 300 may be performed by information security system 110, aspects of which are described herein including with reference to FIGS. 1 and 2.

The process 300 of FIG. 3 begins at step 301, in which a first cybersecurity vulnerability associated with a resource in the computing environment is identified. The vulnerability may be identified as described herein, for example from databases such as 130 of FIGS. 1 and 2, from a user request, from an alert or updated information received from one or more sources.

The process may then proceed to step 302, in which data related to one or more factors related to risk posed by the first cybersecurity vulnerability is obtained. The one or more factors includes at least one factor indicative of a degree of current exploitation of the first cybersecurity vulnerability. The one or more factors may additionally include additional factors described herein, such as a factor indicative of whether the cybersecurity vulnerability has been exploited, a factor indicative of whether the first cybersecurity vulnerability has been observed in ransomware attacks, a factor indicative of whether the first cybersecurity vulnerability has been observed in a nation-state sponsored attack, a factor indicative of presence of the first cybersecurity vulnerability in a cybersecurity provider database, a factor indicative of presence of the first cybersecurity vulnerability in Cybersecurity and Infrastructure Security Agency (CISA) Known Exploited Vulnerabilities (KEV) Catalog, a factor indicative of ease of exploitation of the first cybersecurity vulnerability, a factor indicative of whether a default configuration of the resource is exposed to the first cybersecurity vulnerability, a factor indicative of whether authentication by the computing environment is required for exploitation of the first cybersecurity vulnerability, a factor indicative of availability of a public exploit of the first cybersecurity vulnerability, and a factor indicative of the availability of the first cybersecurity vulnerability in a cybersecurity vulnerability testing platform. Step 302 may be performed by a data collection module such as 111 as discussed with relation to FIGS. 1 and 2.

The process may then proceed to step 303, in which one or more factor weights are determined for the one or more factors related to the risk posed by the first cybersecurity vulnerability. The one or more factor weights may be determined as described herein based on the data obtained relating to the one or more factors of the cybersecurity vulnerability. For example, the weights may be determined to indicate a relative risk posed by each of the factors related to the first cybersecurity vulnerability. Step 303 may be performed by a data analysis module, such as 112 of FIGS. 1 and 2.

The process may then proceed to step 304, in which a first score is determined for the first cybersecurity vulnerability using the determined one or more factor weights. The score may be determined as described herein. For example, the score may be determined by determining a base score for the vulnerability which is adjusted using the one or more factor weights, with the adjusted score providing an indication of the current risk posed by the cybersecurity vulnerability. Step 304 may be performed by a security scoring module such as 113 of FIGS. 1 and 2.

The process may then proceed to step 305, in which one or more security actions are performed based on the determined first score for the first cybersecurity vulnerability. The one or more security actions may include generating vulnerability reports, prioritizing vulnerabilities for corrective actions, determining corrective actions to be performed, automatically performing corrective actions, among other security actions as described in herein. Step 305 may be performed by a security action module such as 114 of FIGS. 1 and 2.

The steps 301-305 may be performed for each of the known cybersecurity vulnerabilities associated with the computing environment. This may include all known cybersecurity vulnerabilities maintained in one or more databases, as described herein. In some embodiments, the steps 301-305 may be performed for new cybersecurity vulnerabilities reported to an information security system from an administrator, or other sources, such as external sources, as described herein. In some embodiments, the acts 301-305 may be performed for each of at least 100 cybersecurity vulnerabilities, at least 1000 cybersecurity vulnerabilities, at least 10,000 cybersecurity vulnerabilities, at least 100,000 cybersecurity vulnerabilities, at least 500,000 cybersecurity vulnerabilities, or at least 1 million cybersecurity vulnerabilities.

Figure 4:
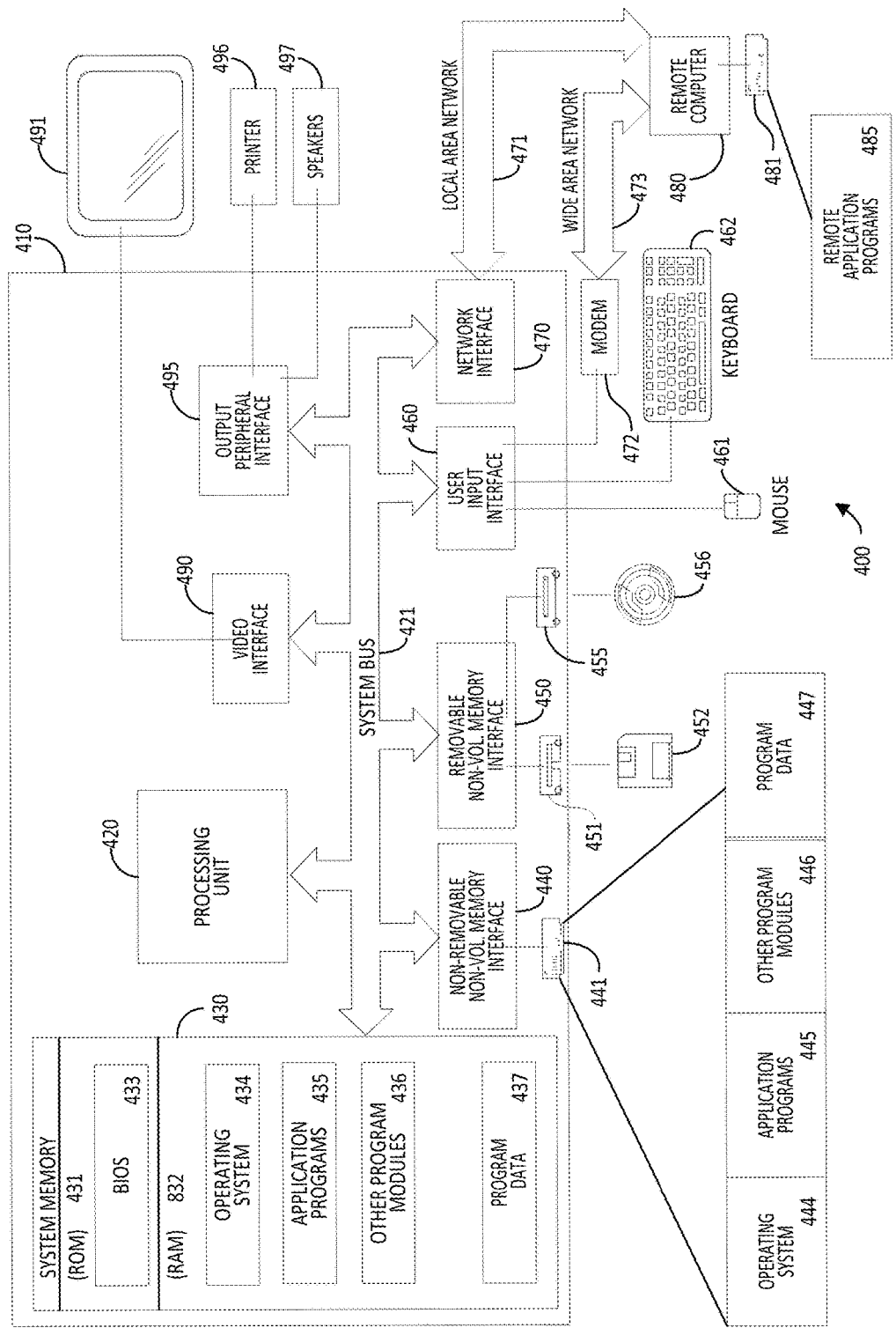
FIG. 4 shows a block diagram of an exemplary computing device, in accordance with some embodiments of the technology described herein.

FIG. 4 shows a block diagram of an exemplary computing device, in accordance with some embodiments of the technology described herein. The computing system environment 400 is only one example of a suitable computing environment and is not intended to suggest any limitation as to the scope of use or functionality of the technology described herein.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the technology described herein includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile or nonvolatile computer storage media. By way of example only, FIG. 4 illustrates a hard disk drive 441 that reads from or writes to non-removable, nonvolatile magnetic media, a flash drive 451 that reads from or writes to a removable, nonvolatile memory 452 such as flash memory, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media described above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. An actor may enter commands and information into the computer 410 through input devices such as a keyboard 462 and pointing device 461, commonly referred to as a mouse, trackball, or touch pad. Other input devices (not shown) may include a microphone, joystick, game pad, satellite dish, scanner, or the like. These and other input devices are often connected to the processing unit 420 through a user input interface 460 that is coupled to the system bus but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device, or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473 but may also include other networks. Such networking environments are commonplace in offices, enterprise-wide computer networks, intranets, and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the actor input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, a tablet computer, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor but may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIG. 3. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for analyzing cybersecurity vulnerabilities in a computing environment, the method comprising:
   using at least one computer hardware processor to perform:
   (A) identifying a first cybersecurity vulnerability associated with a resource in the computing environment;

(B) obtaining data related to one or more factors related to risk posed by the first cybersecurity vulnerability, the one or more factors including at least one factor indicative of a degree of current exploitation of the first cybersecurity vulnerability;

(C) determining, using the obtained data, one or more factor weights for the one or more factors related to the risk posed by the first cybersecurity vulnerability;

(D) determining a first score for the first cybersecurity vulnerability using the determined one or more factor weights;

(E) performing one or more security actions based on the determined first score for the first cybersecurity vulnerability; and after performing act (E):
obtaining second data related to the one or more factors related to risk posed by the first cybersecurity vulnerability;
determining, using the second data, one or more updated factor weights for the one or more factors related to the risk posed by the first cybersecurity vulnerability;
determining an updated score for the first cybersecurity vulnerability using the determined one or more updated factor weights; and
performing one or more security actions based on the determined updated score for the first cybersecurity vulnerability.

2. The method of claim 1, further comprising:
identifying a plurality of cybersecurity vulnerabilities associated with one or more assets in the computing environment, the plurality of cybersecurity vulnerabilities including the first cybersecurity vulnerability;
performing acts (B), (C), and (D) for each of the plurality of cybersecurity vulnerabilities to obtain a respective plurality of scores, the plurality of scores including the first score;
identifying, based on the plurality of scores, one or multiple cybersecurity vulnerabilities of the plurality of cybersecurity vulnerabilities with respect to which to perform a security action; and
performing one or more security actions for the identified one or multiple cybersecurity vulnerabilities.

3. The method of claim 2, wherein identifying the one or multiple cybersecurity vulnerabilities with respect to which to perform a security action comprises:
identifying cybersecurity vulnerabilities, from among the plurality of cybersecurity vulnerabilities, as those cybersecurity vulnerabilities that have scores greater than a threshold score.

4. The method of claim 1, wherein the one or more factors related to risk posed by the first cybersecurity vulnerability further include one or more of: a factor indicative of presence of the first cybersecurity vulnerability in a cybersecurity provider database, a factor indicative of presence of the first cybersecurity vulnerability in Cybersecurity and Infrastructure Security Agency (CISA) Known Exploited Vulnerabilities (KEV) Catalog, a factor indicative of ease of exploitation of the first cybersecurity vulnerability, a factor indicative of whether a default configuration of the resource is exposed to the first cybersecurity vulnerability, a factor indicative of whether authentication by the computing environment is required for exploitation of the first cybersecurity vulnerability, a factor indicative of availability of a public exploit of the first cybersecurity vulnerability, and a factor indicative of the availability of the first cybersecurity vulnerability in a cybersecurity vulnerability testing platform.

5. The method of claim 1, wherein the at least one factor indicative of a degree of current exploitation of the first cybersecurity vulnerability includes one or more of: a factor indicative of whether the first cybersecurity vulnerability has been exploited, a factor indicative of whether the first cybersecurity vulnerability has been observed in ransomware attacks, and a factor indicative of whether the first cybersecurity vulnerability has been observed in a nation-state sponsored attack.

6. The method of claim 1, wherein obtaining data related to one or more factors related to risk posed by the first cybersecurity vulnerability comprises requesting data related to the one or more factors from one or more data sources external to the computing environment.

7. The method of claim 6, wherein the one or more data sources external to the computing environment include one or more data sources selected from among: one or more cybersecurity databases, one or more cybersecurity platform feeds, one or more threat intelligence feeds, one or more cyber-attack reporting sources, and one or more social media platforms.

8. The method of claim 1, wherein obtaining data related to one or more factors related to risk posed by the first cybersecurity vulnerability comprises receiving data related to the one or more factors from one or more data sources external to the computing environment.

9. The method of claim 8, wherein acts (C), (D), and (E) are performed in response to receiving the data related to the one or more factors from the one or more data sources external to the computing environment.

10. The method of claim 1, further comprising:
comparing the second data to the data obtained in act (C); and
determining, based on the comparing, whether the second data is different from the data obtained in act (C), wherein determining the one or more updated factor weights is performed in response to determining the second data is different from the data obtained in act (C).

11. The method of claim 1, wherein determining the first score for the first cybersecurity vulnerability comprises:
determining a base score for the first cybersecurity vulnerability based on a degree of impact and access requirements of the first cybersecurity vulnerability; and
adjusting the base score for the first cybersecurity vulnerability using the factor weights for the one or more factors related to the risk posed by the first cybersecurity vulnerability.

12. The method of claim 1, wherein performing the one or more security actions based on the determined first score for the first cybersecurity vulnerability comprises:
recommending one or more corrective actions to a user, and/or
automatically performing at least one of the one or more corrective actions to address the first cybersecurity vulnerability.

13. A system for monitoring assets in a cloud computing environment, the system comprising:
at least one computer hardware processor; and
at least one non-transitory computer-readable storage medium storing processor-executable instructions that, when executed by the at least one computer hardware processor, causes the at least one computer hardware processor to perform a method comprising:
(A) identifying a first cybersecurity vulnerability associated with a resource in the computing environment;

(B) obtaining data related to one or more factors related to risk posed by the first cybersecurity vulnerability, the one or more factors including at least one factor indicative of a degree of current exploitation of the first cybersecurity vulnerability;
(C) determining, using the obtained data, one or more factor weights for the one or more factors related to the risk posed by the first cybersecurity vulnerability;
(D) determining a first score for the first cybersecurity vulnerability using the determined one or more factor weights; and
(E) performing one or more security actions based on the determined first score for the first cybersecurity vulnerability; and
after performing act (E):
  obtaining second data related to the one or more factors related to risk posed by the first cybersecurity vulnerability;
  determining, using the second data, one or more updated factor weights for the one or more factors related to the risk posed by the first cybersecurity vulnerability;
  determining an updated score for the first cybersecurity vulnerability using the determined one or more updated factor weights; and
  performing one or more security actions based on the determined updated score for the first cybersecurity vulnerability.

14. The system of claim 13, wherein the method further comprises:
  identifying a plurality of cybersecurity vulnerabilities associated with one or more assets in the computing environment, the plurality of cybersecurity vulnerabilities including the first cybersecurity vulnerability;
  performing acts (B), (C), and (D) for each of the plurality of cybersecurity vulnerabilities to obtain a respective plurality of scores, the plurality of scores including the first score;
  identifying, based on the plurality of scores, one or multiple cybersecurity vulnerabilities of the plurality of cybersecurity vulnerabilities with respect to which to perform a security action; and
  performing one or more security actions for the identified one or multiple cybersecurity vulnerabilities.

15. The system of claim 13, wherein the at least one factor indicative of a degree of current exploitation of the first cybersecurity vulnerability includes one or more of: a factor indicative of whether the first cybersecurity vulnerability has been exploited, a factor indicative of whether the first cybersecurity vulnerability has been observed in ransomware attacks, and a factor indicative of whether the first cybersecurity vulnerability has been observed in a nation-state sponsored attack.

16. At least one non-transitory computer-readable storage medium storing processor-executable instructions that, when executed by at least one computer hardware processor, causes the at least one computer hardware processor to perform a method for analyzing cybersecurity vulnerabilities in a computing environment, the method comprising:

(A) identifying a first cybersecurity vulnerability associated with a resource in the computing environment;
(B) obtaining data related to one or more factors related to risk posed by the first cybersecurity vulnerability, the one or more factors including at least one factor indicative of a degree of current exploitation of the first cybersecurity vulnerability;
(C) determining, using the obtained data, one or more factor weights for the one or more factors related to the risk posed by the first cybersecurity vulnerability;
(D) determining a first score for the first cybersecurity vulnerability using the determined one or more factor weights; and
(E) performing one or more security actions based on the determined first score for the first cybersecurity vulnerability; and
after performing act (E):
  obtaining second data related to the one or more factors related to risk posed by the first cybersecurity vulnerability;
  determining, using the second data, one or more updated factor weights for the one or more factors related to the risk posed by the first cybersecurity vulnerability;
  determining an updated score for the first cybersecurity vulnerability using the determined one or more updated factor weights; and
  performing one or more security actions based on the determined updated score for the first cybersecurity vulnerability.

17. The at least one non-transitory computer-readable storage medium of claim 16, wherein the method further comprises:
  identifying a plurality of cybersecurity vulnerabilities associated with one or more assets in the computing environment, the plurality of cybersecurity vulnerabilities including the first cybersecurity vulnerability;
  performing acts (B), (C), and (D) for each of the plurality of cybersecurity vulnerabilities to obtain a respective plurality of scores, the plurality of scores including the first score;
  identifying, based on the plurality of scores, one or multiple cybersecurity vulnerabilities of the plurality of cybersecurity vulnerabilities with respect to which to perform a security action; and
  performing one or more security actions for the identified one or multiple cybersecurity vulnerabilities.

18. The at least one non-transitory computer-readable storage medium of claim 16, wherein the at least one factor indicative of a degree of current exploitation of the first cybersecurity vulnerability includes one or more of: a factor indicative of whether the first cybersecurity vulnerability has been exploited, a factor indicative of whether the first cybersecurity vulnerability has been observed in ransomware attacks, and a factor indicative of whether the first cybersecurity vulnerability has been observed in a nation-state sponsored attack.

* * * * *